No. 634,078. Patented Oct. 3, 1899.
W. C. WINFIELD.
LIFT MECHANISM FOR LANTERN GLOBES.
(Application filed Jan. 26, 1899.)
(No Model.)
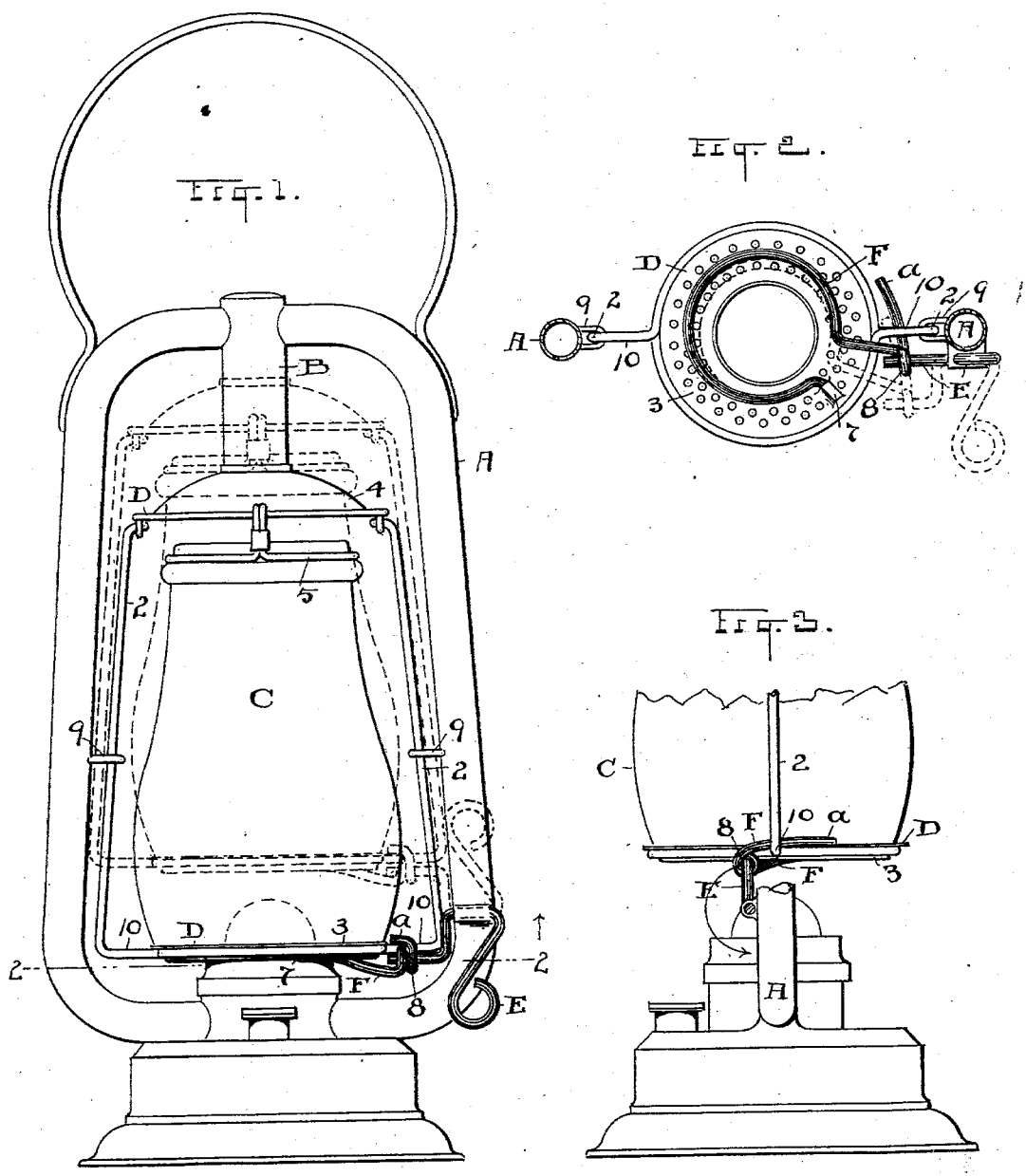
ATTEST
R. B. Moser
H. E. Mudra
INVENTOR.
WILLIAM C. WINFIELD.
BY H. F. Fisher
ATTY
THE NORRIS PETERS CO., PHOTO-LITHO., WASHINGTON, D. C.

UNITED STATES PATENT OFFICE.

WILLIAM C. WINFIELD, OF WARREN, OHIO.

LIFT MECHANISM FOR LANTERN-GLOBES.

SPECIFICATION forming part of Letters Patent No. 634,078, dated October 3, 1899.

Application filed January 26, 1899. Serial No. 703,452. (No model.)

*To all whom it may concern:*

Be it known that I, WILLIAM C. WINFIELD, a citizen of the United States, residing at Warren, in the county of Trumbull and State of Ohio, have invented certain new and useful Improvements in Lift Mechanism for Lantern-Globes; and I do declare that the following is a full, clear, and exact description of the invention, which will enable others skilled in the art to which it appertains to make and use the same.

My invention has reference to lift mechanism for lantern-globes; and the invention consists in the construction and combination of parts, substantially as shown and described, and particularly pointed out in the claims.

In the accompanying drawings, Figure 1 is a plain elevation of a lantern embodying my improvement. Fig. 2 is a cross-section on line 2 2, looking upward, and showing the movable parts in both full and dotted lines, the dotted lines showing half-raised position. Fig. 3 is a side elevation of portions of the lantern, disclosing the globe and the lifting parts as they appear when the globe is raised corresponding to the dotted lines in Fig. 1.

A represents the usual tubular frame, comprising the lantern-base and the draft-tube B above.

C is the globe, and the "globe-frame" D, so called, consists of the side wires 2, globe-supporting perforated plate 3, and canopy 4, the spring-wire loop 5 engaging the top of the globe, as usual. In so far as these several parts alone are concerned I claim no invention; but the invention has to do therewith, as will now be described.

E is an elbow-shaped lever pivoted in a bearing on or in one of the tubes A and constructed and arranged to make a half-rotation, as shown in full and dotted lines, respectively, Fig. 1. The lower position is the normal one, when the globe is seated. The bends or turns in this lever are such as to afford a handle and elbow lift all in one piece, and the handle lies against the tube A in both positions. It might, of course, stand out so as not to bear against the tube; but the construction shown is more compact and the tube forms a stop for the handle in both rotations.

The elbow portion proper of lift-lever E is of such depth as to raise the globe high enough for convenient lighting and is engaged with an arm F, which in this instance reaches under the globe-supporting plate 3, and after being bent around beneath the same is permanently soldered or otherwise fastened at its extremity 7 to the said plate.

It will be understood from the foregoing description that the arm F is really a combination of spring and arm, being made of a wire having sufficient rigidity to serve as a lift and of sufficient elasticity to give a spring effect to the arm, as would occur if the arm were a separate rigid part horizontally movable on the globe-plate and having a spring to help throw it in the extremes of its movements. The spring-loop of the arm F therefore serves a double purpose, and the said arm is thus afforded ample horizontal movement to respond to the lateral throw of the elbow E, to which it is pivotally connected by an eye 8.

The side wires 2 of the globe-frame D work in loops or guides 9 on the tubes A and have right-angle bends 10 below where they go in to make connection with plate 3. In case the lift-arm F be made of comparatively light wire it may be that said arm will require a little help to brace or strengthen it when the globe is lowered. In such cases I form a finger *a* on said arm by extending the wire from eye 8 across the horizontal portion 10 of the side wire, as plainly seen in Fig. 3; but with fairly-heavy wire this help is not needed and the finger *a* may be omitted.

What I claim as new, and desire to secure by Letters Patent, is—

1. In a lantern, a globe-frame, a lifting-lever and an arm mechanically connected with said lever and said frame to lift the frame and globe, said arm connected with the said frame in such relation as to move horizontally when the parts are raised and lowered, substantially as described.

2. The tubular frame and the globe-frame, and means to bodily raise and lower the globe-frame consisting of a lever pivoted on the side of the tubular frame and a horizontally-movable arm secured to the globe-frame and having operating connection with the inner end of the said lever, substantially as described.

3. The air-tubes and the globe-frame, in combination with a crank-lever pivoted on said tubes and a spring-actuated arm secured to the globe-frame and having the said lever connected with its free end, substantially as described.

4. The globe-frame and the air-tubes, a lever pivoted on the side of said tubes and extending inward therefrom, and a spring-arm connected with said lever at its free end having its other end fixed to the globe-frame, substantially as described.

5. In a tubular lantern, the globe-frame and a horizontally-movable spring-arm on the bottom of said frame, in combination with the tubes and a crank lifting-lever pivoted on said tubes and engaged with the said arm, substantially as described.

Witness my hand to the foregoing specification this 12th day of January, 1899.

WILLIAM C. WINFIELD.

Witnesses:
WILLIAM A. SPILL,
M. D. KEE.